United States Patent [19]

DeMaio et al.

[11] Patent Number: 4,962,448

[45] Date of Patent: Oct. 9, 1990

[54] VIRTUAL PIVOT HANDCONTROLLER

[76] Inventors: Joseph DeMaio, 151 Rosemont Ave., Farmingville, N.Y. 11738; Kathleen M. Radke, 4825 Valley Forge La., Plymouth, Minn. 55442; James J. Tauer, 6534 Oakley Dr., Fridley, Minn. 55432

[21] Appl. No.: 251,636

[22] Filed: Sep. 30, 1988

[51] Int. Cl.⁵ .............................................. B64C 13/00

[52] U.S. Cl. .................................. 364/146; 200/6 A; 338/128; 74/471 XY

[58] Field of Search ....................... 364/146; 200/6 A; 338/128; 74/471 XY

[56] References Cited

U.S. PATENT DOCUMENTS

| | | | |
|---|---|---|---|
| 3,936,014 | 2/1976 | Morin | 74/491 |
| 4,012,014 | 3/1977 | Marshell | 74/523 |
| 4,134,560 | 1/1979 | Messerschmidt | 244/17.25 |
| 4,216,467 | 8/1980 | Colston | 414/4 |
| 4,420,808 | 12/1983 | Diamond et al. | 244/177 |
| 4,477,043 | 10/1984 | Repperger | 244/223 |
| 4,531,080 | 7/1985 | Nordstrom et al. | 318/628 |
| 4,555,960 | 12/1985 | King | 74/491 |
| 4,569,244 | 2/1986 | Akerstrom | 200/6 A |
| 4,574,651 | 3/1986 | Nordstrom | 74/491 |
| 4,641,123 | 2/1987 | Whitehead | 338/128 |
| 4,680,465 | 7/1987 | Stevens | 250/229 |
| 4,706,006 | 11/1987 | Solomon | 318/640 |
| 4,738,417 | 4/1988 | Wenger | 244/234 |
| 4,795,952 | 1/1989 | Brandstetter | 338/128 |
| 4,812,802 | 3/1989 | Nishiumi et al. | 338/128 |

*Primary Examiner*—Allen MacDonald

*Attorney, Agent, or Firm*—John G. Shudy, Jr.

[57] ABSTRACT

A movable handcontroller that permits control while requiring low force-displacement gradient. The handcontroller may be used in a side-arm configuration in that it allows the operator's arm to remain essentially motionless in an armrest while control inputs are made about the fulcrum of the wrist.

18 Claims, 4 Drawing Sheets

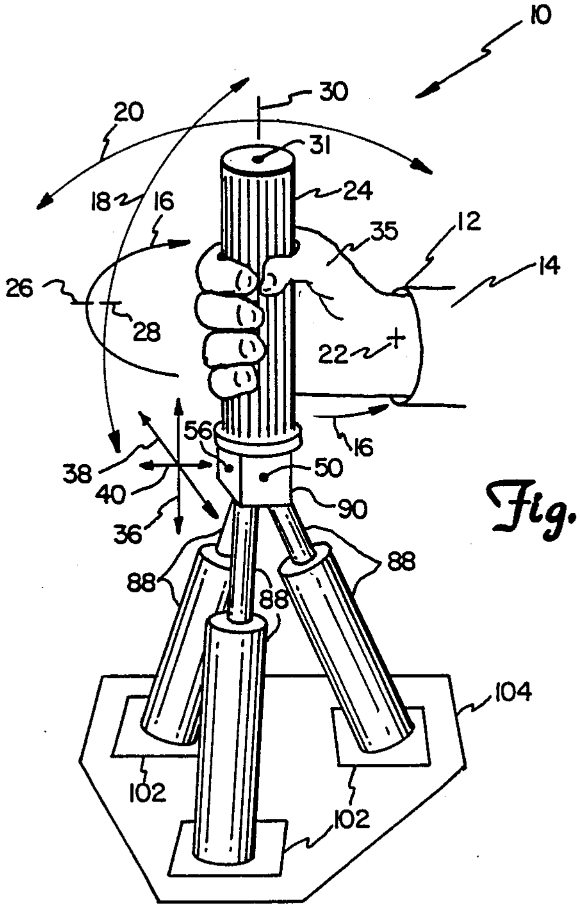
Fig. 1
Fig. 2
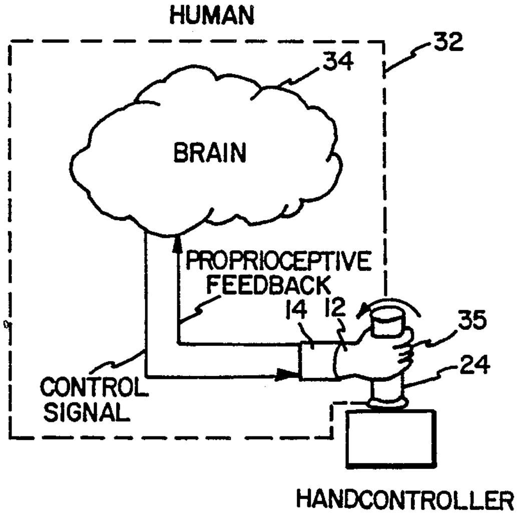

VIRTUAL PIVOT HANDCONTROLLER

FIELD OF THE INVENTION

The present invention pertains to hand-controllers and particularly to aircraft hand-controllers. More particularly, the invention pertains to displacement aircraft handcontrollers.

RELATED ART

The related art involves conventional hand-controllers which rotate about a fixed axis in the base, require movement of both the arm and the wrist, have a high force-displacement gradient, and have either no or complex proprioceptive feedback.

In recent years, space and weight constraints in modern aircraft have resulted in compact fly-by-wire or fly-by-light control systems. Such systems reduce the size and weight of flight control hardware in the cockpit. In addition, these systems permit a side-arm controller configuration that reduces obstruction of the instrument panel area directly in front of the pilot. Two general configurations of those compact controllers have been developed—rigid and moveable displacement. Rigid controllers measure the force of the control input and have no movement associated with input magnitude. Movable controllers have a range of motion of about ±2 inches to ±4 inches associated with the magnitude of the control input. The force required to fully displace a movable controller may be quite small, although the inclusion of a force-displacement gradient has been found to improve control performance.

Difficulties are associated with those both types of handcontrollers. Rigid controllers may produce severe operator fatigue due to a lack of proprioceptive feedback to tell the pilot how much force he is exerting. That difficulty can be reduced by allowing for a small (i.e., $\pm\frac{1}{4}$ inch) amount of displacement or wobble unrelated to the force-output function. Further, rigid controllers provide fairly imprecise control and suffer from input axis cross-coupling, again due to the poor proprioceptive feedback provided to the operator.

Movable controllers can provide reasonable control when a fairly heavy force-output gradient (i.e., $\geqq\pm15$ lbs. at full displacement) is used; however, these high force requirements result in operator fatigue. At lower force requirements, control imprecision and axis cross-coupling are resulting problems.

SUMMARY OF THE INVENTION

The invention is a movable handcontroller configuration that permits accurate control while requiring a relatively low force-displacement gradient. The present handcontroller is useful in a side-arm configuration in that it allows the operator's arm to remain essentially motionless in an armrest while control inputs are made about the fulcrum of the wrist. Conventional movable handcontrollers are merely scaled-down versions of larger center-stick controllers and thus require movement of the entire arm about a fixed axis. The invention has a grip and a sensor platform with a small-displacement handcontroller and an input sensor, and has a motion base with flexible, spring-loaded legs. When the operator provides an input, the handcontroller assembly is rotated in an arc having its center at the operator's wrist.

The handcontroller also has the advantage of rotation about the operator's wrist joint thus requiring movement of the wrist only. It may be said that a very straightforward hardware implementation would be a gimbal arrangement that places the pivot of the handcontroller at a point in space where the operator's wrist is when the operator holds the controller grip. Such an approach is impracticable since each such handcontroller would have to be custom-designed to fit a hand of a particular size, and therefore one controller would not work with all its advantages for all operators of various sizes. Also, each multi-degree gimbal requires extensive and expensive machining.

The present invention has a "virtual pivot" that permits inputs to be made about any point in space and the invention translates movement of the controller grip about a point in space (such as the operator's wrist joint) into movements of a sensor about an internal reference point thereby permitting one handcontroller to optimally function for all hand sizes. The handcontroller permits control input movements of the hand to be made in isolation from the forearm. Such movement eliminates the need for the operator to move his arm to accommodate the movement of the grip assembly about a fixed pivot; yet it allows a sufficient range of motion to provide for proprioceptive feedback.

The invention, or the "virtual pivot handcontroller" (i.e., adjustable pivot), has dynamic characteristics that minimizes operator fatigue during use. Also, the handcontroller design accommodates a large range of variation in the size of the operator's hand in a fashion much superior to handcontrollers of the related art. The virtual pivot handcontroller has great market potential in fixed-wing aircraft, helicopters and space vehicles, particularly where a compact, accurate and non-fatiguing handcontroller is needed.

BRIEF DESCRIPTION OF THE DRAWINGS

FIG. 1 shows the invention and its various degrees of freedom.

FIG. 2 illustrates the principle of proprioceptive feedback.

DESCRIPTION OF THE PREFERRED EMBODIMENTS

Figure 3:
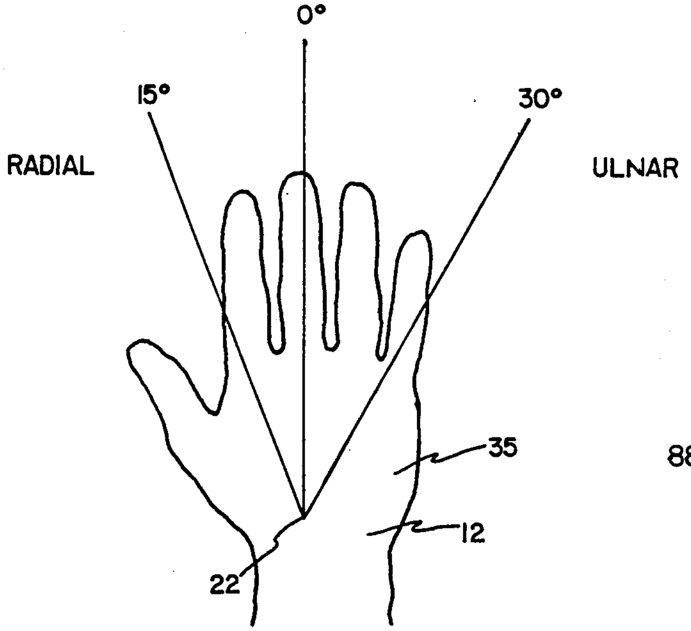
FIG. 3 shows the degree of wrist movement in one dimension.

Handcontroller 10 of FIG. 1 allows the user to input control actions 16, 18 and 20 through motions about wrist axis 22 of the human wrist 12 joint rather than about the axes within arm 14 or the body. Motion 18 represents the pitch rotational motion of handcontroller 10 with only wrist action and no arm movement. Motion 20 represents the roll rotational motion of handcontroller 10 with only wrist action and no arm movement. Motion 16 represents the yaw rotational motion grip 24 of handcontroller 10. No motion of arm 14 is required for actions 16, 18 and 20 and the operator only needs the activate muscles within wrist complex 12. Actions 16, 18 and 20 are less fatiguing than actions requiring full arm motion since a smaller displacement is required and smaller muscle groups are involved. Also use of a smaller set of muscles increases the precision of control motions. In order to conform to motions of exclusive wrist 12 action, grip 24 is able to translate through space on paths 18 and 20 which follow circumferences of radii having center 22 according to different wrist rotation profiles as illustrated in FIG. 1.

The neutral position of handcontroller 10 is plainly evident to the operator. When the operator's hand is removed from grip 24, grip 24 returns through opposing spring tensions, to centers 26, 28 and 30 of rotation motion paths or axes 16, 18 and 20, respectively. A clear and crisp detent allows for tactile identification of center positions 26, 28 and 30. Controller 10 is self-centering in that grip 24 returns to its neutral or center position when all input forces are removed. The force (i.e., breakout force) required to move grip 24 out of its neutral positions 26, 28 and 30, is great enough to make the null positions 26, 28 and 30 obvious to the operator and to avoid accidental activation, but small enough to avoid wrist fatigue of the operator. The controlling forces required to move grip 24 out of any center position 26, 28 or 30, increase linearly with distance from the respective center position 26, 28 or 30, yet do not exceed fatigue limits. An operator is able to hold grip 24 at an attitude away from any center position 26, 28 and 30 for long periods of time without fatiguing the wrist complex 12 muscle groups.

The linear relationship of increased force of grip 24 allows operator 32, in FIG. 2, to rely on proprioceptive feedback from affected muscle groups of wrist 12 to determine the position of grip 24. Proprioceptive feedback closes the control loop between brain 34 of operator 32 and thus operator 32 is able to determine the position of grip 24 solely on the basis of tactile sense of hand 35 and wrist 12.

Handcontroller 10 may be conveniently mounted near or on an operator's chair having an armrest on the side where handcontroller 10 is located. Hand-controller 10 is effectively mounted with grip 24 slightly tilting forward of the vertical, while in a neutral position, due to the nature of the average normal range of wrist 12. Typical radial deviation of wrist 12, as illustrated in FIG. 3, averages 15 degrees above the central position and the ulnar deviation averages 30° below the central hand position. The forward tilting of grip 24 neutralizes the difference of those deviations and enhances control inputs about wrist axis 22.

Grip 24 of handcontroller 10 has, in addition to three rotational degrees of freedom 16, 18 and 20, three translational degrees of freedom 36, 38 and 40 which are fore-aft motion 40, side-to-side motion 38, and up-and-down motion 36. Without external forces applied to handcontroller 10, grip 24 rests in a common neutral position in translational degrees of freedom 36, 38 and 40, as well as rotational degrees of freedom 16, 18 and 20. Rotational degrees of freedom are accomplished by mechanism or spring-loaded universal joint 90. Translational degrees of freedom are accomplished by spring-loaded, sliding legs 88.

The various positions of grip 24 are transmitted to a device receptive of control by handcontroller 10 via electrical signals from mechanical-to-electrical transducers mounted within controller 10. Those transducers may be one of several kinds. The transducers utilized in the present embodiment are potentiometers.

Figure 4:
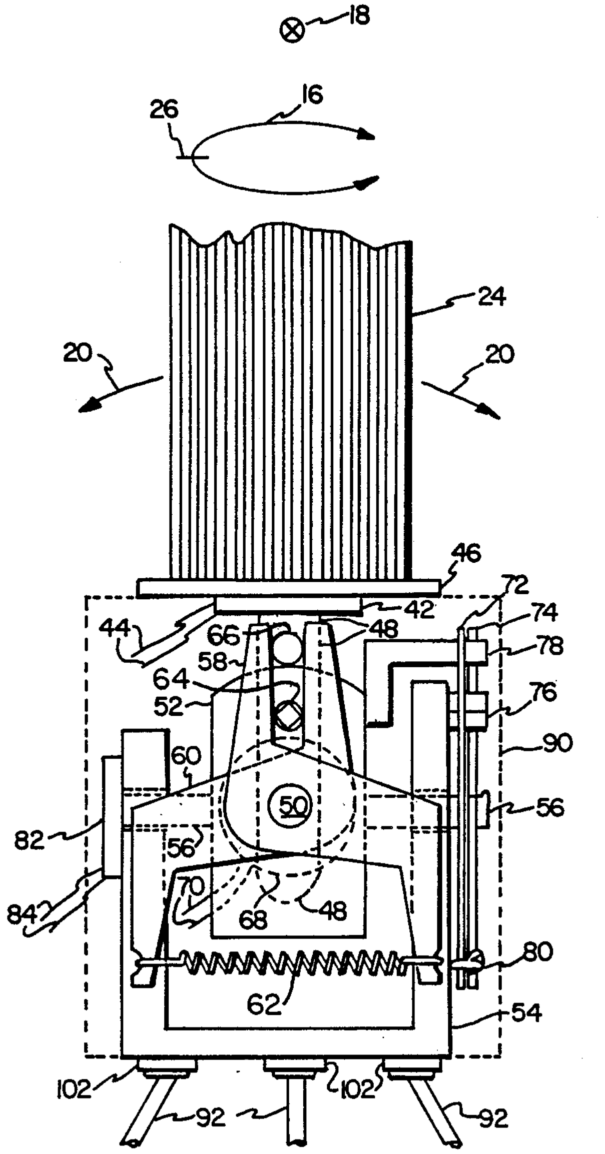
FIG. 4 reveals the mechanism for the rotational degrees of freedom of the handcontroller.
Figure 7:
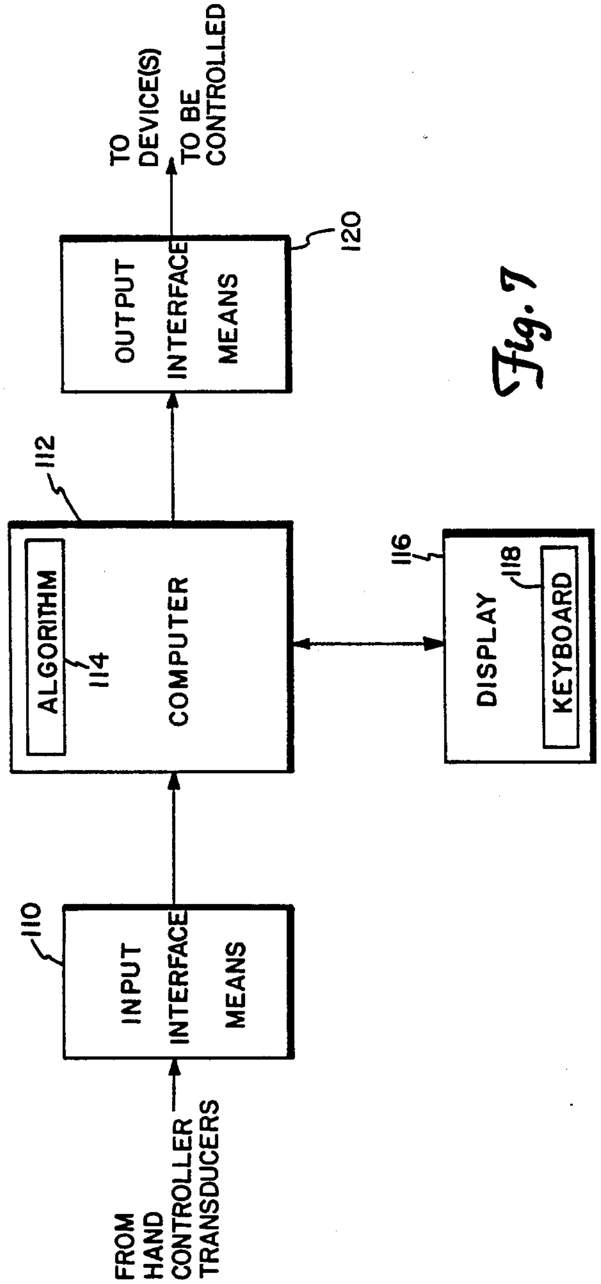
FIG. 7 is a block diagram of the interfacing between the handcontroller and a controlled device.

The structure of handcontroller 10 includes handgrip 24 that rotates about its own center vertical axis 31, in either direction as illustrated by path 16 in FIGS. 1 and 4. Grip 24 is connected to a center shaft of potentiometer 42 having electrical leads 44. The amount of rotation of handgrip 24 is determinable by the amount of resistance between leads 44. Grip 24 has a return clock-spring-like mechanism connected to potentiometer 42 and to grip 24, which causes grip 24 to remain or return to neutral position 26 having a detent discernible by operator 32. The grip 24 return spring mechanism and associated detent are housed in base 46 of grip 24.

Potentiometer 42, having grip 24 mounted to it, is attached to shank 48 which is movable about shaft 50 in FIG. 4. Rotation of shank 48 about shaft 50 allows for movement of grip 24 along path 20. Shaft 50 extends through and is rigidly attached to plate 52. Plate 52 is rigid and unmovable in the direction of path 20 relative to base 54. Plate 52 is rigidly fixed to shaft 56 that is transverse to shaft 50. Shaft 56 is not rotatable or movable relative to plate 52 but is rotatable relative to base 54 along path 18 which has a midway direction that is perpendicular to the surface of FIG. 4. Mounted to but rotatable on shaft 50 are scissors leg 58 and scissors leg 60. Scissors leg 60 is mounted closest to plate 52. Scissors legs 58 and 60 are connected to each other with spring 62. Diamond-shape pin 64 is rigidly mounted to plate 52. Pin 64 extends toward legs 58 and 60 and functions as a stop to prevent leg 58 from moving further clockwise from its position as shown in FIG. 4 and to prevent leg 60 from moving further counterclockwise from its position as shown in FIG. 4. Spring 62 of a given tension keeps legs 58 and 60 against pin 64, in clockwise and counterclockwise directions, respectively.

Movement of grip 24 and correspondingly, shank 48, clockwise about shaft 50 results in pin 66 moving clockwise, contacting leg 60 and moving leg 60 clockwise thereby increasing the tension of spring 62 because leg 58 does not move as it is held from moving clockwise by pin 64. Movement of grip 24 and shank 48 counterclockwise about shaft 50 results in pin 66 moving counterclockwise, contacting leg 58 and moving leg 58 counterclockwise thereby increasing the tension of spring 62 because leg 60 does not move as it is held from moving counterclockwise by pin 64. Pin 66 is rigidly mounted on shank 48. The opposing forces of legs 58 and 60 on pin 64 provide a detent space between legs 58 and 60 wherein pin 66 rests in a neutral position without forces being applied to grip 24. As grip 24 is moved clockwise or counterclockwise, the tension against the respective direction of movement increases with distance, as spring 62 tension increases, thereby providing proprioceptive feedback to operator 32 so that operator 32 can know the output or position of grip 24, by the feel of grip 24. Shaft 50 is connected to potentiometer 68 and potentiometer 68 is mounted to plate 52, so that movement of grip 24 in direction or path 20 can be indicated by electrical signals due to the amount of resistance between leads 70.

Movement of grip 24 in direction or path 18 is detented and measured by a similar mechanism as used for movement of grip 24 in direction or path 20, as described above. FIG. 4 shows an edgewise view of the scissors and detent mechanism for path 18 movement of handgrip 24. The function and operation of the scissor and detent mechanism for path 18 movement is the same as the function and operation of the scissor and detent mechanism for path 20 movement of grip 24. The parallel and corresponding parts of like function and structure of the two mechanisms are: scissors leg 72 corresponds to leg 60; scissors leg 74 corresponds to leg 58; shift 56 corresponds to shaft 50; base plate 54 corresponds to plate 52; diamond-shaped pin 76 corresponds to pin 64; pin 78 corresponds to pin 66; spring 80 corresponds to spring 62; and potentiometer 82 having leads 84 corresponds to potentiometer 68 having leads 70. Pin 78 is rigidly attached plate 52. As grip 24 is moved along path 18, pin 78 moves similarly and moves leg 72 or 74, depending upon the direction of movement along path 18. Plate 52, having pin 78 attached to it, performs the same function for movement of grip 24 along path 18 as shank 48, having pin 66 attached, does for movement of grip 24 along path 20. Legs 72 and 74 are in tension in opposite directions against pin 76 due to the tension of spring 80. Both legs 72 and 74 are against pin 76 when grip 24 is in neutral position 28 of path 18.

Besides three rotational degrees of freedom 16, 18 and 20, handcontroller 10 provides for control signals generated through three translational degrees of freedom that are permitted through the use of three or four handcontroller 10 support legs 88.

The present and best embodiment 10 has three legs 88 which vary in length in accordance with translational motion inputs to handgrip 10. In up-and-down motion 36, legs 88, either one, some or all, expand or compress, respectively. In side-to-side motion 38 and fore-and-aft movement 40, legs 88 expand and compress, alternatively and/or simultaneously, in an accomodating fashion.

Figure 5:
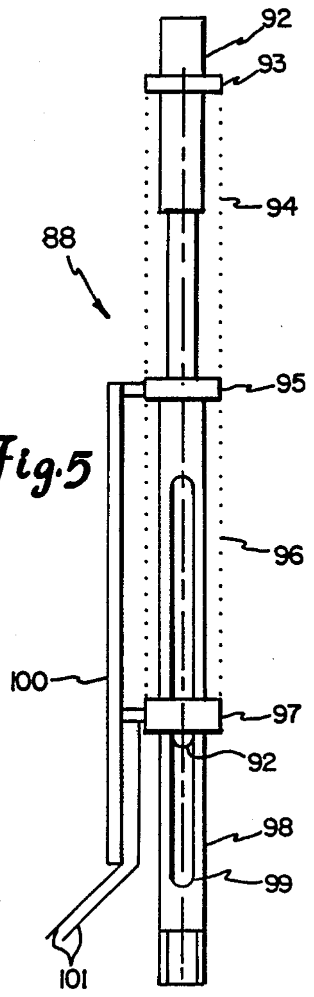
FIG. 5 is a view of one of the legs for the translational degrees of freedom.

Telescoping or spring-loaded variable-length leg 88 in FIG. 5 has rod 92 and pipe 98. Rod 92 slides into pipe 98. Spring 94 is attached to rod 92 by bracket 93 and to pipe 98 by bracket 95. Spring 96 is attached to pipe 98 by bracket 95 and to rod 92 by bracket 97 through slot 99. As leg 88 is shortened, spring 94 is compressed and spring 96 is expanded. As leg 88 is lengthened, spring 94 is expanded and spring 96 is compressed. The combined forces of springs 94 and 96, absent external forces, return leg 88 to a detent or neutral length. The springs may be adjusted or replaced to alter the required input translational forces at grip 24. Translational movements 36, 38 and 40 are translated into a combination of lengths of legs 88. The length of each leg 88 may be communicated via a resistance of a respective slide potentiometer 100 having leads 101.

Figure 6:
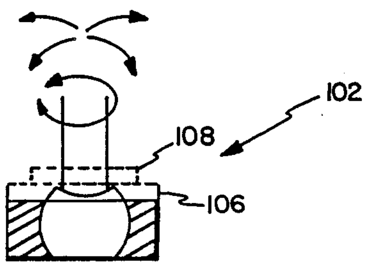
FIG. 6 shows the joint mechanism attached to the ends of the legs.

FIG. 6 shows pivotable ball-like joint 102 that is at each end of legs 88. Pivot joint 102 allows the leg to move around and rotate. Joints 102 secure legs 88 at pipes 98 to base and support plate 104. Joints 102 secure legs 88 at rods 92 to mechanism 90 at base plate 54. Each of joints 102 at rods 92 to mechanism 90 has a rubber or like-material washer 106 under tension or pressure of metal or like-material washer 108 secured rigidly to rod 92, so as to allow movement of each of joints 102 at rods 92 but not to allow legs 88 to tip-over and collapse from the weight of various components of handcontroller 10.

The outputs of transducers 42, 68, 82 and 100 go to input interface means 110 which appropriately converts analog signals of the transducers to digital signals that go on to computer 112. Computer 112 processes the signals from interface means 110, in conjunction with algorithm 114 that transforms transducer signals into control signals indicating separately first, second and third degrees of rotational motion 16, 18 and 20 and first, second and third degrees of translational motion 36, 38 and 40, wherein a combination of rotational and translational transducer signals may represent only degrees of rotational motion and a combination of rotational and translational transducer signals may represent only degrees of translational motion. Algorithm 114 transforms the mixed transducer signals into the appropriately designated control signals specifically representing signal inputs for pure rotational and translational control motions. The transmission of rotational or translational inputs as a mix of rotational and translational motion signals is referred to as "crosstalk". Algorithm 114 removes the crosstalk. Also algorithm 114 may have computer 112 output control signals having certain characteristics including specific scaling factors. Algorithm 114 and similar algorithms may be developed by one skilled in the computer software arts, without undue experimentation.

Computer 112 may be connected to display 116 for displaying any variety of indications of handcontroller 10 inputs and/or computer 112 control outputs. Keyboard 118 may be in the system for inputting or modifying algorithm 114, controlling computer 112 including its associated memories, or doing other desired functions.

Control signals go from computer 112 to output interface means 120 to transform the digital signals, as where required, into analog signals with sufficient driving power. The signals from interface means 120 go to the device or devices to be controlled.

The following is claimed:

1. A virtual pivot handcontroller, having six degrees of freedom of motion, comprising:
   - a spring-loaded universal joint;
   - a handle connected to said universal joint;
   - at least one spring-loaded, variable-length leg connected to said universal joint; and
   - support means, connected to said at least one leg, for supporting said virtual pivot handcontroller; and
   - wherein:
     - said handle has first, second and third degrees of rotational motion and first, second and third degrees of translational motion; and
     - said universal joint comprises:
       - a base connected to said at least one leg;
       - a first shaft connected to said base and rotatable about a first axis transverse to said base;
       - a plate rigidly attached to said first shaft;
       - a second shaft connected to said plate and rotatable about a second axis orthogonal to said first axis;
       - a shank rigidly attached to said second shaft and connected to said handle;
       - first spring means for providing spring tension, connected to said plate and to said base in a fashion such that the rotational position of said first shaft is maintained under tension at a neutral position relative to said base and said first shaft requires an external force to be rotated from the neutral position; and
       - second spring means for providing spring tension, connected to said second shaft and to said shank in a fashion such that the rotational position of said second shaft is maintained under tension at a neutral position relative to said first shaft and said second shaft requires an external force to be rotated from the neutral position.

2. Apparatus of claim 23 wherein said at least one leg comprises:

a rod connected to said base;

a pipe slideably connected to said rod in a telescopic fashion such that overall length of said rod and said pipe is variable, and connected to said support means; and spring means for providing tension, connected to said rod and to said pipe in a fashion such that the length of said leg, without any external force exerted on said leg, is maintained under the spring tension at a neutral length between a minimum length of said leg and maximum length of said leg, such that an external compression force exerted on said leg causes said leg to shorten and an external stretch force exerted on said leg causes said leg to lengthen.

3. A virtual pivot handcontroller, having six degrees of freedom of motion, comprising:

a spring-loaded universal joint;

handle connected to said universal joint;

a plurality of spring-loaded, variable-length legs connected to said universal joint; and support means, connected to said plurality of legs, for supporting said virtual pivot handcontroller, having a plane intersecting all connections of said plurality of legs, parallel to said support means; and wherein:

said handle has first, second and third degrees of rotational motion and first, second and third degrees of translational motion;

the first degree of rotational motion is caused by rotation of said handle about the longitudinal axis of said shank (yaw);

the second degree of rotational motion is caused by moving said handle by a hand utilizing only wrist motion in a forward and backward curved direction (pitch). approximately orthogonal to the plane of said support means with an associated arm in an essentially fixed position relative said support means and having the pivot of handle motion moveable to adapt to the wrist motion;

the third degree of rotational motion is caused by moving said handle by the hand utilizing only wrist motion in a side-to-side curved direction (roll) with the associated arm in an essentially fixed position relative to said support means and having the pivot of handle motion moveable to adapt to the wrist motion;

the first degree of translational motion is caused by movement of said handle in a straight direction orthogonal to the plane of said support means, utilizing primarily arm movement;

the second degree of translational motion is caused by movement of said handle in a straight forward and backward direction parallel to the plane of said support means, utilizing primarily arm movement;

the third degree of translational motion is caused by movement of said handle in a straight side-to-side direction utilizing primarily arm movement; and said universal joint comprises:

a base connected to said plurality of legs;

a first shaft connected to said base and rotatable about a first axis transverse to said base;

a plate rigidly attached to said first shaft;

a second shaft connected to said plate and rotatable about a second axis orthogonal to said first axis;

a shank rigidly attached to said second shaft and connected to said handle;

first spring means for providing spring tension, connected to said plate and to said base in a fashion such that the rotational position of said first shaft is maintained under tension at a neutral position relative to said base and said first shaft requires an external force to be rotated from the neutral position; and second spring means for providing spring tension, connected to said second shaft and to said shank in a fashion such that the rotational position of said second shaft is maintained under tension at a neutral position relative to said first shaft and said second shaft requires an external force to be rotated from the neutral position.

4. Apparatus of claim 3 wherein each leg of said plurality of legs comprises:

a rod connected to said base;

a pipe slideably connected to said rod in a telescopic fashion such that overall length of said rod and said pipe is variable, and connected to said support means;

spring means connected to said rod and to said pipe in a fashion such that the length of said leg, without any external force exerted on said leg, is maintained under a spring tension at a neutral length between a minimum length of said leg and maximum length of said leg, such that an external compression force exerted on said leg causes said leg to shorten and an external stretch force exerted on said leg causes said leg to lengthen.

5. Apparatus of claim 4 further comprising:

a first plurality of pivot ball-like joints that attach the rods of said plurality of variable-length legs to said base; and a second plurality of pivot ball-like joints that attach the pipes of said plurality of variable length legs to said support means.

6. Apparatus of claim 5 wherein each of said first plurality of pivotable ball-like joints comprises:

a socket attached to said base; and a ball attached to said rod of said plurality of legs and inserted within and moveably attached to said socket.

7. Apparatus of claim 6 wherein each of said second plurality of pivotable ball-like joints comprises:

a socket attached to said support means; and a ball attached to said pipe of said plurality of legs and inserted within and moveably attached to said socket.

8. Apparatus of claim 7 wherein each of said first plurality of pivotable ball-like joints further comprises:

a flexible washer fitted on the rod of each of said plurality of legs and closely abutting said ball; and an inflexible washer fitted on the rod of each of said plurality of legs, firmly and closely abutting said flexible washer, and rigidly attached to said rod.

9. Apparatus of claim 8 wherein said handle is attached to said shank in such a fashion by being capable of rotation in clockwise and counterclockwise directions, with an external rotational force applied in the respective direction, and having a spring mechanism that returns to or retains at a neutral position said handle when the external rotational force about the longitudinal shank axis is removed.

10. Apparatus of claim 9 further comprising:

first rotational transducer means, connected to said handle and to said shank, for converting rotational mechanical displacement between said handle and said shank into electrical signals indicating amount and direction of rotational mechanical displacement;

second rotational transducer means, connected to said first shaft and to said base, for converting rotational mechanical displacement between said first shaft and said base into electrical signals indicating amount and direction of rotational mechanical displacement; and third rotational transducer means, connected to said first shaft and to said shank, for converting rotational mechanical displacement between said first shaft and said shank into electrical signals indicating amount and direction of rotational mechanical displacement.

11. Apparatus of claim 10 wherein each of said plurality of variable-length legs comprises translational transducer means, connected to said rod and to said pipe, for converting translational mechanical displacement into electrical signals indicating the amount of translational mechanical displacement.

12. Apparatus of claim 11 further comprising:

first interface means, connected to said first, second, third transducer means and to said translational transducer means of each of said plurality of legs, for converting signals from said transducers into electrical digital signals;

computer means, connected to said first interface means, for processing the digital signals from said first interface means into control signals; and second interface means, connected to said computer means for interfacing the control signals to device(s) to be controlled.

13. Apparatus of claim 12 wherein said computer comprises an algorithm that transforms transducer signals into control signals indicating separately first, second and third degrees of rotational motion and first, second and third degrees of translational motion, wherein a combination of rotational and translational transducer signals represent only degrees of rotational motion and a combination of rotational and translational transducer signals represent only degrees of translational motion, and said algorithm transforms the transducer signals into control signals having characteristics as designated in said algorithm.

14. Apparatus of claim 13 further comprising a display means, connected to said computer means, for displaying handcontroller motion inputs and computer control outputs.

15. Apparatus of claim 11 wherein the number of variable-length legs is three.

16. A virtual pivot handcontroller, having six degrees of freedom of motion, comprising:

a spring-loaded universal joint;

a handle connected to said universal joint;

a plurality of spring-loaded, variable-length legs connected to said universal joint; and support means, connected to said plurality of legs, for supporting said virtual pivot handcontroller, having a plane intersecting all connections of said plurality of legs, parallel to said support means; and wherein said universal joint comprises:

a base connected to said plurality of legs;

a first shaft connected to said base and rotatable about a first axis transverse to said base;

a plate rigidly attached to said first shaft;

a second shaft connected to said plate and rotatable about a second axis orthogonal to said first axis;

a shank rigidly attached to said second shaft and connected to said handle;

first spring means for providing spring tension, connected to said plate and to said base in a fashion such that the rotational position of said first shaft is maintained under tension at a neutral position relative to said base and said first shaft requires an external force to be rotated from the neutral position; and a second shaft connected to said plate and rotatable about a second axis orthogonal to said first axis;

a shank rigidly attached to said second shaft and connected to said handle;

first spring means for providing spring tension, connected to said plate and to said base in a fashion such that the rotational position of said first shaft is maintained under tension at a neutral position relative to said base and said first shaft requires an external force to be rotated from the neutral position; and second spring means for providing spring tension, connected to said second shaft and to said shank in a fashion such that the rotational position of said second shaft is maintained under tension at a neutral position relative to said first shaft and said second shaft requires an external force to be rotated from the neutral position.

17. Apparatus of claim 16 wherein each leg of said plurality of legs comprises:

a rod connected to said base;

a pipe slideably connected to said rod in a telescopic fashion such that overall length of said rod and said pipe is variable, and connected to said support means; and spring means for providing spring tension, connected t said rod and to said pipe in a fashion such that the length of said leg, without any external force exerted on said leg, is maintained under the spring tension at a neutral length between a minimum length of said leg and maximum length of said leg, such that an external compression force exerted on said leg causes said leg to shorten and an external stretch force exerted on said leg causes said leg to lengthen.

18. Apparatus of claim 17 further comprising:

a first plurality of pivot ball-like joints that attach the rods of said plurality of variable-length legs to said base; and a second plurality of pivot ball-like joints that attach the pipes of said plurality of variable length legs to said support means.

* * * * *

UNITED STATES PATENT AND TRADEMARK OFFICE

CERTIFICATE OF CORRECTION

PATENT NO. : 4,962,448

DATED : October 9, 1990

INVENTOR(S) : Joseph DeMaio, Kathleen M. Radke & James L. Tauer

It is certified that error appears in the above-identified patent and that said Letters Patent is hereby corrected as shown below:

Column 6, line 67, delete "23" and substitute --1--.

Column 10, line 19, delete "a second shaft connected to said plate and rotatable about a second axis orthogonal to said first axis; a shank rigidly attached to said second shaft and connected to said handle; first spring means for providing spring tension, connected to said plate and to said base in a fashion such that the rotational position of said first shaft is maintained under tension at a neutral position relative to said base and said first shaft requires an external force to be rotated from the neutral position; and".

Column 10, line 46, delete "t" and substitute --to--.

Signed and Sealed this

Twenty-first Day of April, 1992

*Attest:*

HARRY F. MANBECK, JR.

*Attesting Officer*

*Commissioner of Patents and Trademarks*

UNITED STATES PATENT AND TRADEMARK OFFICE
CERTIFICATE OF CORRECTION

PATENT NO. : 4,962,448

DATED : October 9, 1990

INVENTOR(S) : Joseph DeMaio et al.

It is certified that error appears in the above-identified patent and that said Letters Patent is hereby corrected as shown below:

On the title page:

Item (73) please add --Honeywell, Inc.-- as assignee.

Signed and Sealed this

Twentieth Day of April, 1993

*Attest:*

MICHAEL K. KIRK

*Attesting Officer* *Acting Commissioner of Patents and Trademarks*